W. R. COLLIER.
INSULATOR.
APPLICATION FILED AUG. 16, 1920.

1,372,940.

Patented Mar. 29, 1921.

INVENTOR.
William R. Collier
BY
Hardway Cathey
ATTORNEYS.

UNITED STATES PATENT OFFICE.

WILLIAM R. COLLIER, OF MONT BELVIEU, TEXAS.

INSULATOR.

1,372,940.     Specification of Letters Patent.     Patented Mar. 29, 1921.

Application filed August 16, 1920. Serial No. 403,632.

*To all whom it may concern:*

Be it known that I, WILLIAM R. COLLIER, a citizen of the United States, residing at Mont Belvieu, in the county of Chambers and State of Texas, have invented certain new and useful Improvements in Insulators, of which the following is a specification.

This invention relates to new and useful improvements in an insulator.

One object of the invention is to provide an insulator which has been specially formed for the purpose of insulating, from each other, the adjoining rails of a railway track.

With the above and other objects in view, the invention has particular relation to certain novel features of construction, operation and arrangement of parts, and use, an example of which is given in this specification and illustrated in the accompanying drawings, wherein:—

Figure 1:
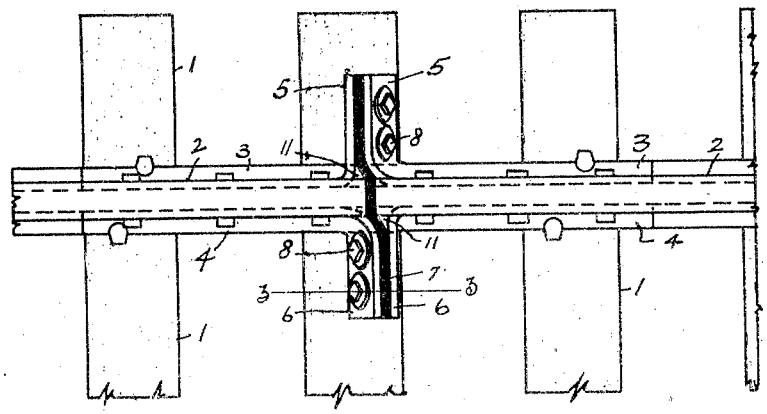
Figure 1 is a plan view of a section of railway track showing the insulator applied.
Figure 2:
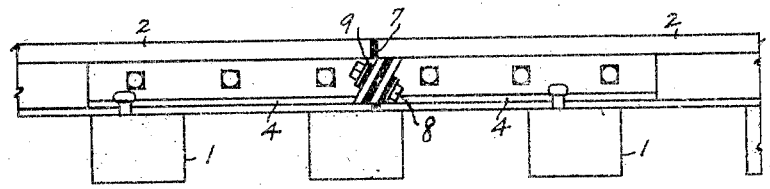
Fig. 2 is a side view thereof.
Figure 3:
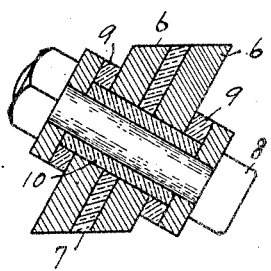
Fig. 3 is a transverse sectional view taken on the line 3—3 of Fig. 1.

Referring now more particularly to the drawings wherein like numerals of reference designate similar parts in each of the figures, the numerals 1 designate the railway ties and the numerals 2, 2 designate adjoining rails of the track, whose adjacent ends are spaced slightly apart. Fish plates 3, 3 and 4, 4 are secured to opposite sides of the adjacent ends of the rails 2. These fish plates are secured to the rails by means of suitable bolts in the well known manner. Each fish plate is turned outwardly, at its rail end, at substantially right angles to the rail, thus forming the out-turned portions 5, 5 and 6, 6, which are spaced apart, and fitted between these out-turned ends, and also between the corresponding ends of the rails, there is a sheet 7 of insulating material, which insulates the out-turned ends 5 and 6 of the fish plates of one rail from the opposing corresponding parts of the fish plates of the other rail.

The out-turned ends 5, 5 and 6, 6 of the fish plates are secured together by means of bolts as 8, which are insulated from the fish plates by the insulators 9 and 10.

It is to be noted that at the angle of one of the fish plates 3 and the corresponding angle of the diagonally opposite fish plate 4, said fish plates are so formed as to be spaced from the insulating sheet 7, said spaces being indicated by the numerals 11, 11, so that there will be no liability of the insulation 7 being cut through by the angles of the fish plates to complete a circuit.

It is to be noted that the out-turned portions 5, 5 and 6, 6 are inclined relative to the vertical line of the joint, so that the relative vertical movement of the respective rail ends, due to the passage of the wheel over them, and the corresponding movement of said out-turned portions will not be so liable to mutilate the insulator 7 between them.

What I claim is:—

1. A device of the character described, including the adjacent ends of railway rails, fish plates secured on opposite sides of each rail and having outwardly turned ends, inclined relative to the vertical line of the joint, and an insulator fitted between said out-turned ends.

2. A device of the character described, including the adjacent ends of railway rails, fish plates secured on opposite sides of each rail and having out-turned ends on one side of the rail being inclined in the opposite direction to those on the other side, inclined relative to the vertical line of the joint and an insulator fitted between said out-turned ends.

In testimony whereof I have signed my name to this specification in the presence of two subscribing witnesses.

WILLIAM R. COLLIER.

Witnesses:
   JNO. B. OLIVER,
   WM. A. CATHEY.